US011050261B2

(12) United States Patent
Nishigai

(10) Patent No.: US 11,050,261 B2
(45) Date of Patent: Jun. 29, 2021

(54) FUEL CELL SYSTEM, EXTERNAL MANAGEMENT APPARATUS, FUEL CELL APPARATUS, AND CONTROL METHOD FOR FUEL CELL APPARATUS

(71) Applicant: KYOCERA Corporation, Kyoto (JP)

(72) Inventor: Takanobu Nishigai, Hiratsuka (JP)

(73) Assignee: KYOCERA Corporation, Kyoto (JP)

( * ) Notice: Subject to any disclaimer, the term of this patent is extended or adjusted under 35 U.S.C. 154(b) by 772 days.

(21) Appl. No.: 15/739,974

(22) PCT Filed: Jun. 24, 2016

(86) PCT No.: PCT/JP2016/003073
§ 371 (c)(1),
(2) Date: Dec. 26, 2017

(87) PCT Pub. No.: WO2016/208205
PCT Pub. Date: Dec. 29, 2016

(65) Prior Publication Data
US 2018/0375337 A1    Dec. 27, 2018

(30) Foreign Application Priority Data
Jun. 26, 2015 (JP) .............................. JP2015-129162

(51) Int. Cl.
*H01M 8/04* (2016.01)
*H01M 8/04858* (2016.01)
(Continued)

(52) U.S. Cl.
CPC ......... *H02J 3/387* (2013.01); *H01M 8/04604* (2013.01); *H01M 8/04626* (2013.01);
(Continued)

(58) Field of Classification Search
CPC . H01M 8/04; H01M 8/04858; H01M 8/04537
See application file for complete search history.

(56) References Cited

U.S. PATENT DOCUMENTS 8,427,110 B2    4/2013 Oya
2002/0163819 A1* 11/2002 Treece ................ H01M 8/0662
                                                  363/34
2011/0068719 A1    3/2011 Oya

FOREIGN PATENT DOCUMENTS

JP    H8-171919 A    7/1996
JP    2002-247765 A   8/2002
(Continued)

OTHER PUBLICATIONS

Machine Translation of: JP 08-171919, Takeda, Jul. 2, 1996.*
(Continued)

*Primary Examiner* — Kenneth J Douyette
(74) *Attorney, Agent, or Firm* — Procopio Cory Hargreaves and Savitch LLP

(57) ABSTRACT

A fuel cell system includes fuel cell apparatuses and an external management apparatus. Each of the fuel cell apparatuses includes a controller that controls the fuel cell apparatus in any of multiple operating modes that include a master mode and a slave mode. The external management apparatus acquires the power consumption of the load, generates control information for controlling an operation state of the fuel cell apparatuses on the basis of the power consumption, and transmits the control information to a fuel cell apparatus operating in master mode. This apparatus controls its own operation state and the operation state of the other fuel cell apparatuses on the basis of the received control information.

8 Claims, 6 Drawing Sheets

(51) Int. Cl.
  *H01M 8/04537* (2016.01)
  *H02J 3/38* (2006.01)
  *H02J 3/46* (2006.01)

(52) U.S. Cl.
  CPC ... *H01M 8/04858* (2013.01); *H01M 8/04932* (2013.01); *H02J 3/38* (2013.01); *H02J 3/46* (2013.01); *Y02A 30/60* (2018.01)

(56) References Cited

FOREIGN PATENT DOCUMENTS

| | | |
|---|---|---|
| JP | 2003-174726 A | 6/2003 |
| JP | 2004-173388 A | 6/2004 |
| JP | 2007-273252 A | 10/2007 |
| JP | 2010-114000 A | 5/2010 |
| JP | 2011-67047 A | 3/2011 |

OTHER PUBLICATIONS

International Search Report dated Aug. 9, 2016, issued by Japan Patent Office for International Application No. PCT/JP2016/003073.
Written Opinion of the International Searching Authority dated Aug. 9, 2016, issued by Japan Patent Office for International Application No. PCT/JP2016/003073.

\* cited by examiner

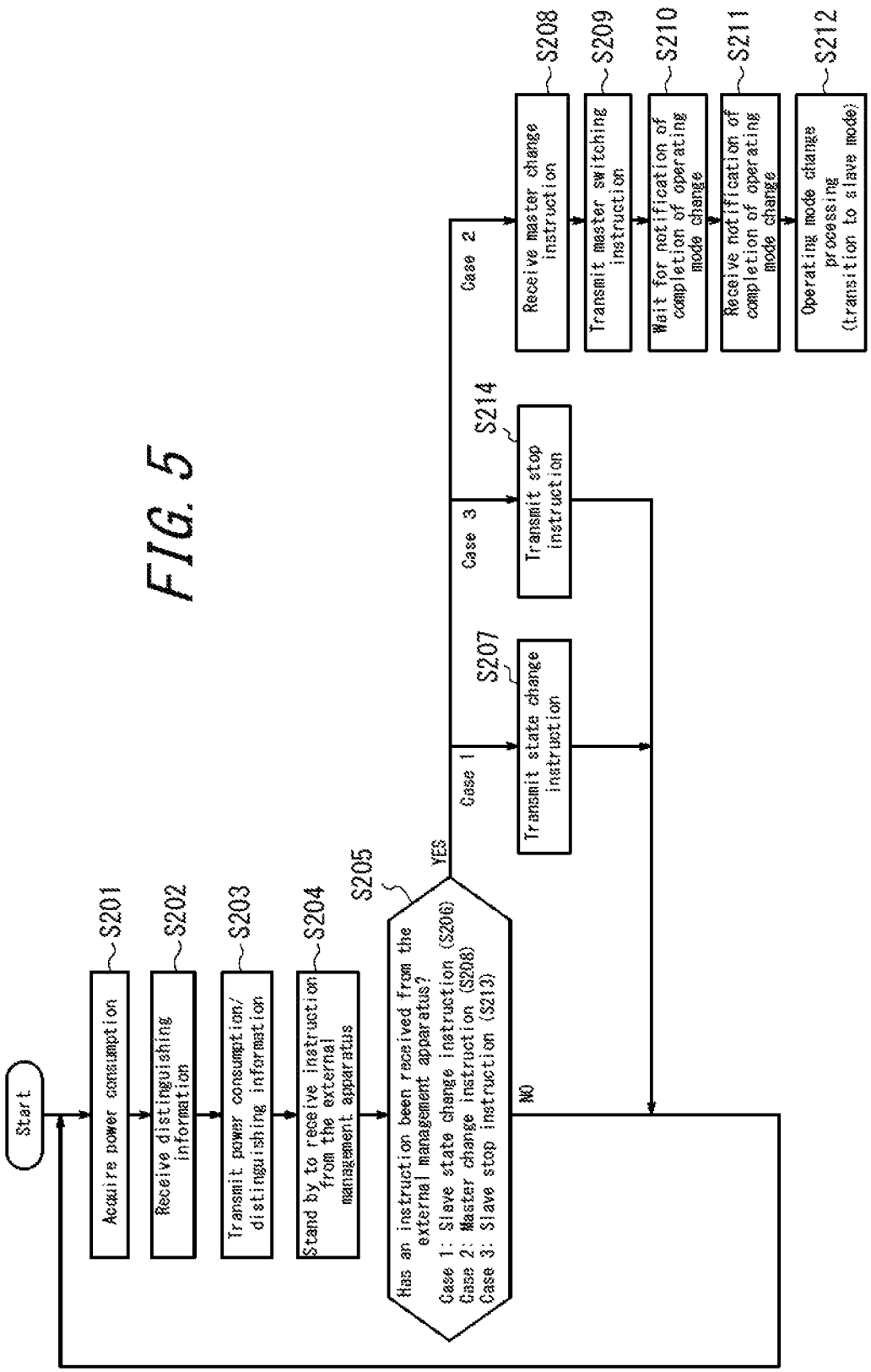

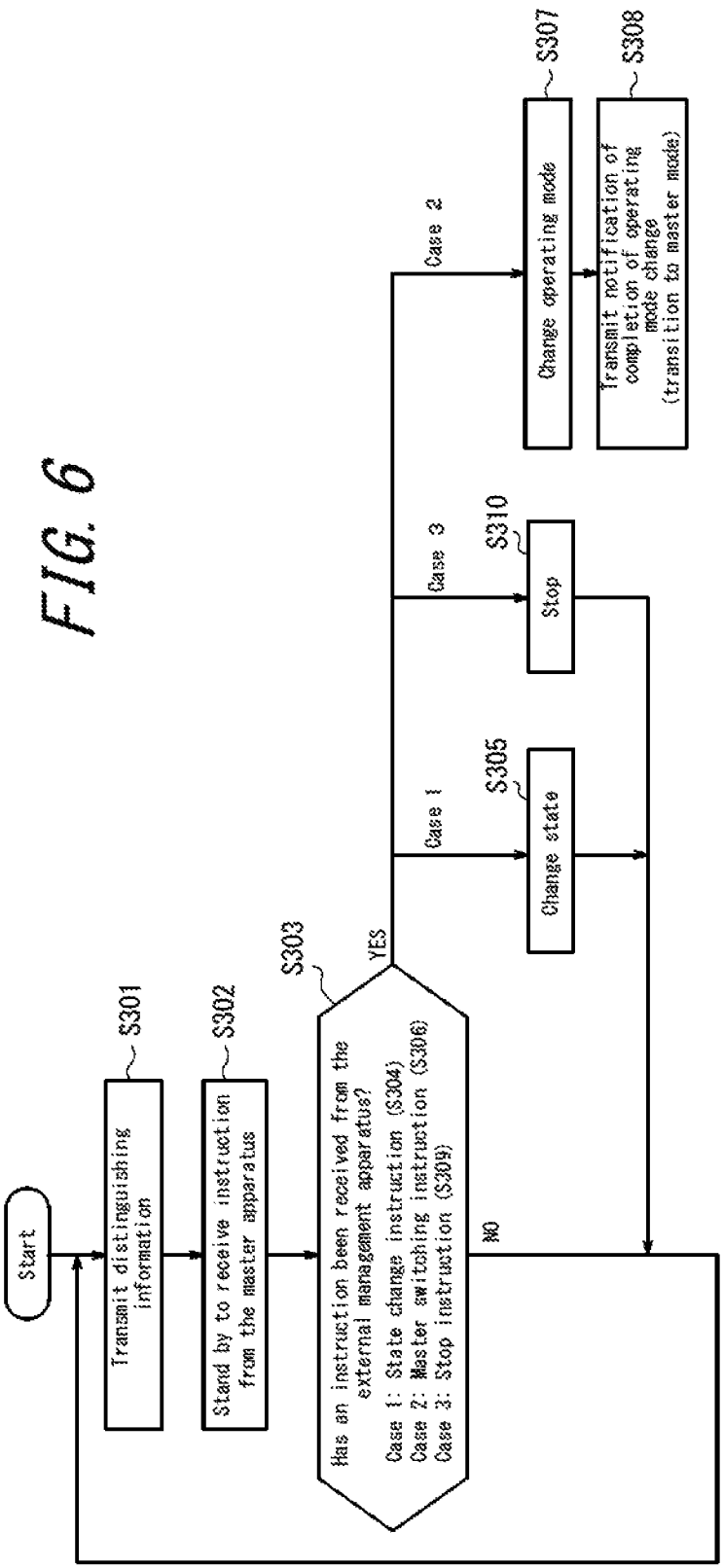

FUEL CELL SYSTEM, EXTERNAL MANAGEMENT APPARATUS, FUEL CELL APPARATUS, AND CONTROL METHOD FOR FUEL CELL APPARATUS

CROSS-REFERENCE TO RELATED APPLICATION

This application claims priority to and the benefit of Japanese Patent Application No. 2015-129162 filed Jun. 26, 2015, the entire contents of which are incorporated herein by reference.

TECHNICAL FIELD

The disclosure relates to a fuel cell system that includes a plurality of fuel cell apparatuses, an external management apparatus, a fuel cell apparatus, and a control method for a fuel cell apparatus.

BACKGROUND

A power generation apparatus capable of adjusting output of a fuel cell apparatus or the like, for example, is used to supply power to a load in a consumer facility. Improvement in the output of the power generation apparatus is desired. One method for doing so is to operate a plurality of power generation apparatuses in parallel.

Power generation apparatuses each typically include a corresponding control apparatus, and it is conceivable that the control apparatuses could each control their respective power generation apparatus independently. However, having each power generation apparatus control itself is not necessarily appropriate for improving the utilization rate of the plurality of power generation apparatuses as a whole and for extending the lifespan of each power generation apparatus. Patent literature (PTL) 1, for example, therefore proposes adjusting the output of a plurality of power generation apparatuses with a single operation control apparatus.

CITATION LIST

Patent Literature

PTL 1: JP 2002-247765 A

SUMMARY

A fuel cell system of the disclosure includes a plurality of fuel cell apparatuses, configured to supply power to a load, and an external management apparatus. The plurality of fuel cell apparatuses and the external management apparatus are connected to a network and configured to communicate with each other. Each fuel cell apparatus in the plurality of fuel cell apparatuses includes a controller configured to control its respective fuel cell apparatus in any of a plurality of operating modes comprising a master mode and a slave mode, wherein a fuel cell apparatus performing control in the master mode controls its own operation state and an operation state of another fuel cell apparatus, and a fuel cell apparatus performing control in the slave mode controls its own operation state according to operation state control received from another fuel cell apparatus. The external management apparatus comprises an acquisition interface, an information generator, and an output interface. The acquisition interface is configured to acquire a power consumption of the load. The information generator is configured to generate control information, on the basis of the power consumption, for controlling the operation state of the plurality of fuel cell apparatuses. The output interface is configured to output the control information to a fuel cell apparatus operating in the master mode. A fuel cell apparatus operating in the master mode controls its own operation state and the operation state of another fuel cell apparatus on the basis of the control information output by the external management apparatus.

An external management apparatus of the disclosure comprises an acquisition interface, an information generator, and an output interface. The acquisition interface is configured to acquire a power consumption of a load. The information generator is configured to generate control information for controlling an operation state of a plurality of fuel cell apparatuses on the basis of the power consumption. The plurality of fuel cell apparatuses is connected to a network and configured to communicate with each other. Each fuel cell apparatus in the plurality of fuel cell apparatuses is configured to operate in any of a plurality of operating modes comprising a master mode and a slave mode, wherein a fuel cell apparatus performing control in the master mode controls its own operation state and an operation state of another fuel cell apparatus, and a fuel cell apparatus performing control in the slave mode controls its own operation state according to operation state control received from another fuel cell apparatus. Each fuel cell apparatus in the plurality of fuel cell apparatuses is configured to supply power to the load. The output interface is configured to output the control information to a fuel cell apparatus operating in the master mode.

A fuel cell apparatus of the disclosure comprises a power generator, a timing unit, a memory, a controller, a transmitter, and a receiver. The power generator is configured to output power. The timing unit is configured to count a cumulative operating time of the fuel cell apparatus. The memory is configured to store a rated output of the fuel cell apparatus. The controller is configured to control the fuel cell apparatus in any of a plurality of operating modes comprising a master mode and a slave mode, wherein the fuel cell apparatus controls its own operation state and an operation state of another fuel cell apparatus during operation in the master mode, and the fuel cell apparatus controls its own operation state according to operation state control received from another fuel cell apparatus during operation in the slave mode. The transmitter is configured to transmit at least one of the cumulative operating time of the fuel cell apparatus and the rated output of the fuel cell apparatus as distinguishing information during operation in the slave mode. The receiver is configured to receive the distinguishing information from another fuel cell apparatus during operation in the master mode. The transmitter is configured to transmit the distinguishing information of the fuel cell apparatus and of the another fuel cell apparatus to an external management apparatus during operation in the master mode. The receiver is configured to receive control information from the external management apparatus for controlling an operation state of the fuel cell apparatus and of the another fuel cell apparatus during operation in the master mode.

A control method for a fuel cell apparatus of the disclosure comprises acquiring a power consumption of a load. The control method comprises generating control information for controlling an operation state of a plurality of fuel cell apparatuses on the basis of the power consumption. The control method comprises outputting the control information to a fuel cell apparatus operating in a master mode. The control method comprises controlling, by the fuel cell apparatus operating in the master mode, the operation state of the fuel cell apparatus operating in the master mode and the operation state of another fuel cell apparatus on the basis of the control information. The plurality of fuel cell apparatuses are connected to a network and configured to communicate with each other. The plurality of fuel cell apparatuses are configured to supply power to the load. Each fuel cell apparatus in the plurality of fuel cell apparatuses is configured to operate in any of a plurality of operating modes comprising the master mode and a slave mode, wherein a fuel cell apparatus operating in the master mode controls its own operation state and an operation state of another fuel cell apparatus, and a fuel cell apparatus operating in the slave mode controls its own operation state according to operation state control received from another fuel cell apparatus.

BRIEF DESCRIPTION OF THE DRAWINGS

In the accompanying drawings:

FIG. 5 is a processing flowchart of the fuel cell apparatus operating in master mode; and FIG. 6 is a processing flowchart of the fuel cell apparatus operating in slave mode.

DETAILED DESCRIPTION

Embodiments of the disclosure are described below with reference to the drawings.

First Embodiment

Figure 1:
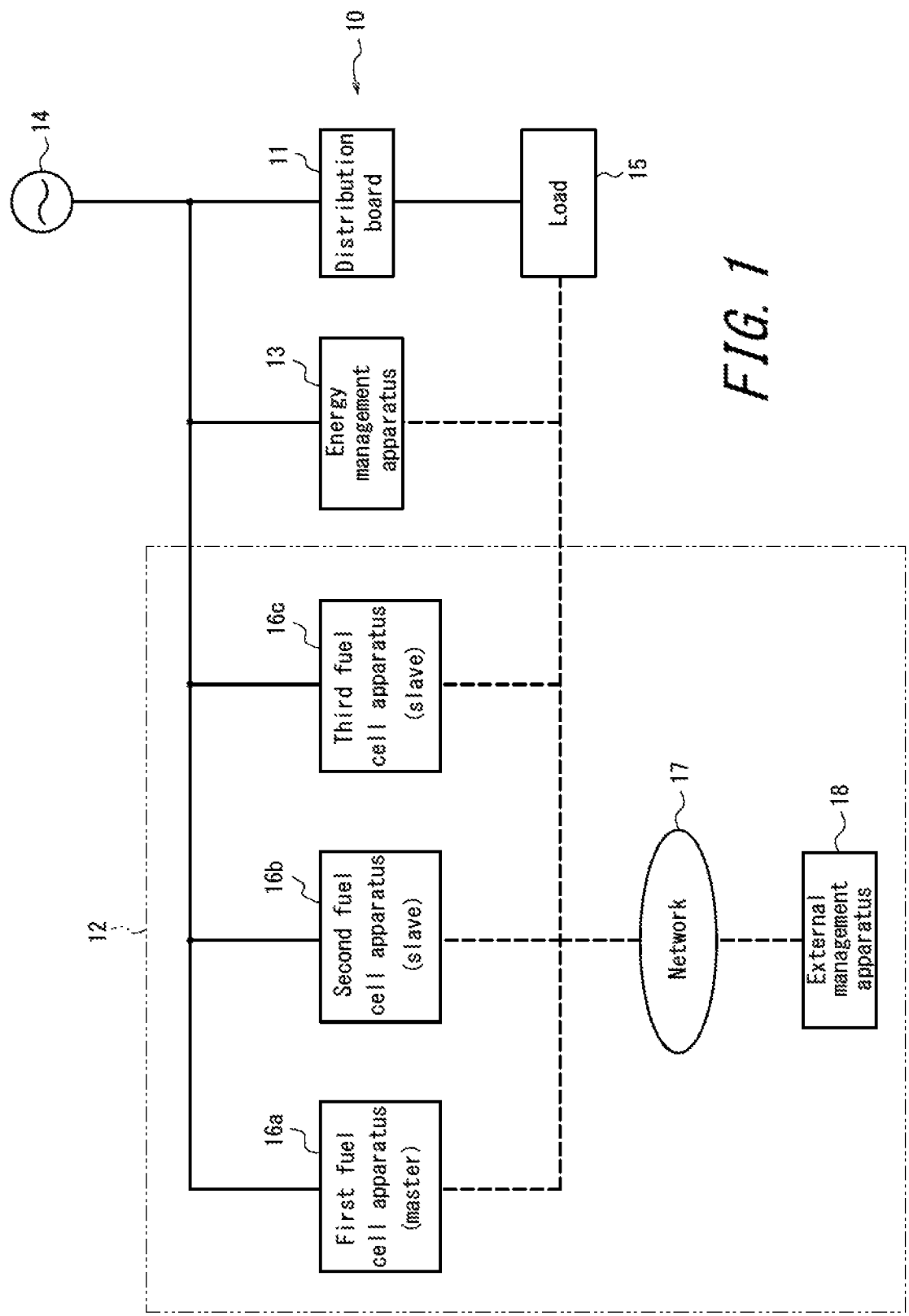
FIG. 1 is a functional block diagram illustrating the schematic configuration of a power apparatus system that includes a fuel cell system according to a first embodiment.

In FIG. 1, the solid lines connecting functional blocks indicate the flow of power. Also, in FIG. 1, the dashed lines connecting functional blocks indicate the flow of control signals or communicated information. The flow of control signals or communicated information indicated by the dashed lines may correspond to wired or wireless communication. Various methods including infrared communication, ZigBee® (ZigBee is a registered trademark in Japan, other countries, or both) and other such short distance communication methods, power line communication (PLC), and the like may be used to communicate control signals or information.

A power supply system 10 includes a distribution board 11, a fuel cell system 12, an energy management apparatus 13, and the like.

The distribution board 11 divides the power supplied from the fuel cell system 12 and a power grid 14 into a plurality of branches and distributes the power to a load 15. The load 15 is a power load that consumes power. The load 15 may, for example, be equipment that consumes power and is used inside the same consumer facility, such as air conditioning equipment, lighting, a refrigerator, and the like. The load 15 includes a power sensor and can transmit information indicating its own power consumption ("power consumption") to other components.

The fuel cell system 12 includes a plurality of fuel cell apparatuses, for example three fuel cell apparatuses constituted by the first to third fuel cell apparatuses 16a to 16c, and an external management apparatus 18. Hereinafter, the first to third fuel cell apparatuses 16a to 16c are simply referred to as the fuel cell apparatuses 16a to 16c. These fuel cell apparatuses 16a to 16c output power to the distribution board 11 in parallel. The fuel cell apparatuses 16a to 16c can communicate with each other and with the load 15, and also with the external management apparatus 18 over a network 17 such as the Internet. The number of fuel cell apparatuses in the fuel cell system is not limited to three. Two fuel cell apparatuses or four or more may be included.

For the sake of convenience, the first fuel cell apparatus 16a is described as operating in the below-described master mode, and the second fuel cell apparatus 16b and third fuel cell apparatus 16c as operating in the below-described slave mode. The former is referred to as the "master apparatus 16a" and the latter as the "slave apparatuses 16b, 16c" or the like as appropriate. As described below, however, the operating mode can be switched between the first to third fuel cell apparatuses 16a to 16c. It may be the case that the first fuel cell apparatus 16a operates in slave mode, and one of the second and third fuel cell apparatuses 16b, 16c operates in master mode. The "operating mode" in the present application refers to a form of operating distinguished by a difference in the control method for the fuel cell apparatus.

The external management apparatus 18 is a device that controls the fuel cell system 12 and may, for example, be a personal computer, workstation, or other such universal computer on which a dedicated processing program is loaded, or may be a dedicated computer. The external management apparatus 18 can be installed in a remote location from the fuel cell apparatuses 16a to 16c over the network 17, and while managing the fuel cell apparatuses 16a to 16c, the external management apparatus 18 can also manage fuel cell apparatuses in other facilities. The external management apparatus 18 receives information, such as the cumulative operating time of the first to third fuel cell apparatuses 16a to 16c, from the master apparatus 16a and transmits a state change instruction or the like for a particular fuel cell apparatus 16a to 16c to the master apparatus 16a.

The energy management apparatus 13 is an apparatus that manages energy within the facility. The energy management apparatus 13 can, for example, collect the power consumption from the equipment constituting the load 15 on the basis of a communication standard such as ECHONET Lite® (ECHONET Lite is a registered trademark in Japan, other countries, or both), Smart Energy Profile (SEP) 2.0, or the like. The energy management apparatus 13 monitors the power consumption of the load. The energy management apparatus 13 may be configured to collect power consumption from the distribution board 11, which has an intelligent function.

Figure 2:
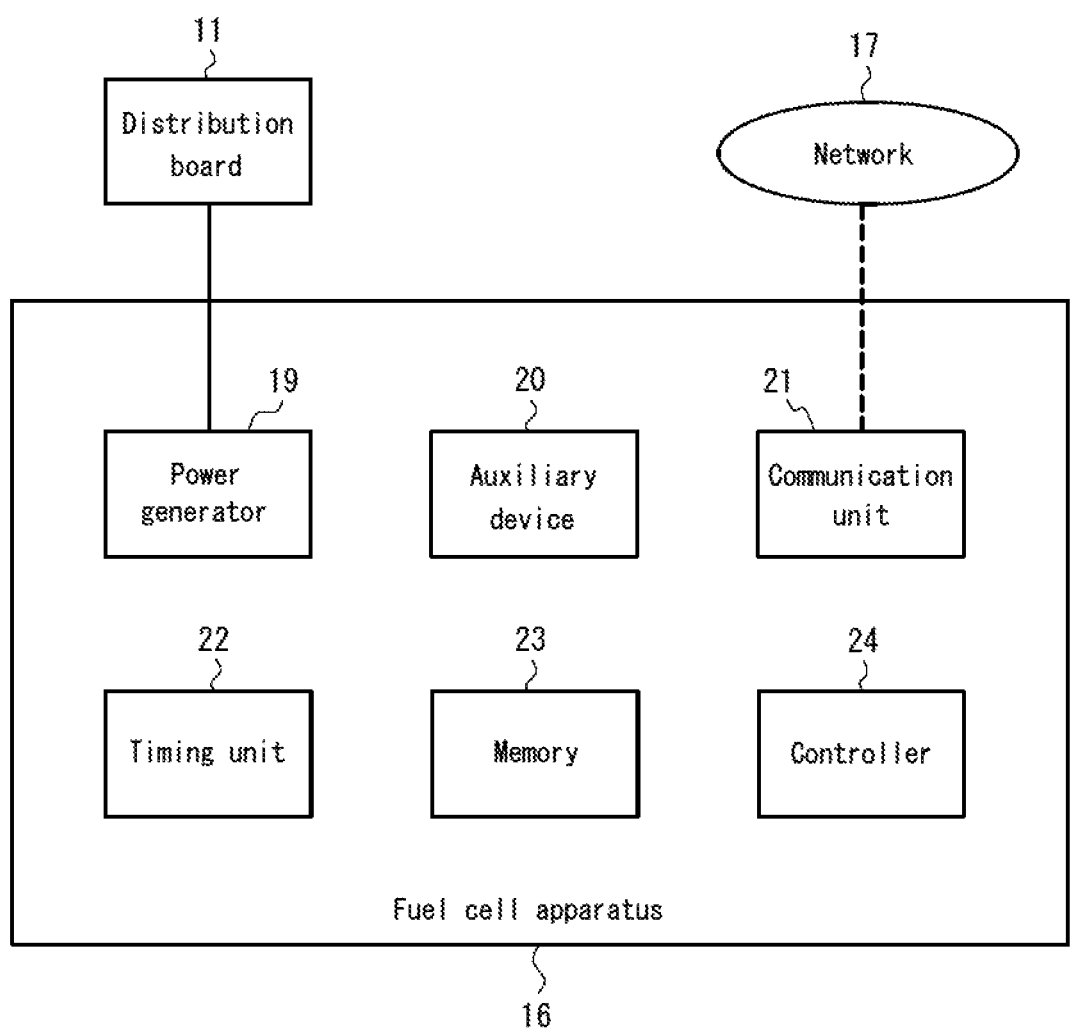
FIG. 2 is a functional block diagram illustrating the schematic configuration of the first to third fuel cell apparatuses in FIG. 1.

The configuration of the first to third fuel cell apparatuses 16a to 16c is described below with reference to FIG. 2. Any of the first to third fuel cell apparatuses 16a to 16c is represented below and in FIG. 2 by a fuel cell 16 as appropriate. The fuel cell apparatus 16 can, for example, be a solid oxide fuel cell apparatus or may be a different type of fuel cell apparatus capable of continuous operation. The fuel cell apparatus 16 can switch between any of the following operation states: a stopped state, a standby state, and a power generation state.

The "operation state" in the present application refers to a state related to power generation of the fuel cell apparatus. Among the operation states of the fuel cell apparatus 16, the power generation state refers to a state of generating power. The stopped state refers to a state in which power generation is stopped, peripheral devices (auxiliary devices) related to power generation are also stopped, and power from an external source is also almost not used. Transitioning from the stopped state to the power generation state requires time to raise the cell temperature to between 700 and 1000 degrees. During the stopped state, the portion of the fuel cell apparatus 16 performing communication with the outside and control of the apparatus continues to operate. The standby state refers to a state in which some of the peripheral devices are operated to allow transition to the power generation state faster than from the stopped state. In this case, the fuel cell apparatus 16 receives a supply of power from the external power grid 14 to maintain the standby state.

The fuel cell apparatus 16 includes a power generator 19, one or more auxiliary devices 20, a communication unit 21, a timing unit 22, a memory 23, a controller 24, and the like. The communication unit 21 includes a transmitter and a receiver.

The power generator 19 includes a reformer, a cell stack, and an inverter, for example. The reformer reforms fuel gas to produce hydrogen. The cell stack generates direct current (DC) power using hydrogen. The inverter converts DC power to alternating current (AC) power. The power generator 19 outputs the AC power converted by the inverter to the distribution board 11.

The one or more auxiliary devices 20 are peripheral devices necessary to operate the power generator 19 and include an air blower, a heater, and the like. The one or more auxiliary devices 20 may be a type that operates only during the power generation state of the fuel cell apparatus 16, a type that operates during both the standby state and the power generation state, a type that operates only during the standby state, or the like. During the standby state of the fuel cell apparatus 16, the fuel cell apparatus 16 requires power to operate the one or more auxiliary devices 20. During the standby state of the fuel cell apparatus 16, the one or more auxiliary devices 20 function as a portion of the load 15.

The communication unit 21 communicates, i.e. transmits and receives, a variety of information between the first fuel cell apparatus 16a and external devices. For example, in the case of the master apparatus 16a, the respective communication unit 21 receives the cumulative operating time from the communication unit 21 of the slave apparatuses 16b, 16c. The communication unit 21 can also receive the power consumption of the load 15 from the energy management apparatus 13. Furthermore, the communication unit 21 can transmit the cumulative operating time of the first to third fuel cell apparatuses 16a to 16c and/or the power consumption of the load 15 to the external management apparatus 18. The cumulative operating time is counted by the below-described timing unit 22. The cumulative operating time is one type of distinguishing information.

On the other hand, in the case of the slave apparatus 16b or 16c, the respective communication units 21 transmit the cumulative operating time to the fuel cell apparatus 16a, which is the master apparatus.

Furthermore, in the case of the master apparatus 16a, the respective communication unit 21 receives control information from the external management apparatus 18 and transmits control information for controlling the slave apparatuses 16b, 16c to the slave apparatuses 16b, 16c. In the case of the slave apparatus 16b or 16c, the respective communication units 21 receive the control information for their corresponding apparatuses from the master apparatus 16a.

The timing unit 22 is, for example, a timer that, under the control of the below-described controller 24, starts to count the cumulative operating time during which the respective fuel cell apparatus 16 is in the power generation state after the fuel cell apparatus 16 starts to operate. The cumulative operating time is a measure of the cumulative power generation time after the start of operation of the fuel cell apparatus 16. The timing unit 22 may also individually manage the operating times of a plurality of constituent elements within the fuel cell apparatus 16. In the example below, one cumulative operating time is counted for each fuel cell apparatus 16.

The memory 23 is configured using any memory resource, such as a flash memory. The memory 23 stores characteristics of the respective apparatus such as the rated output of the apparatus, identifying information of the master apparatus within the same fuel cell system 12 when operating in slave mode, identifying information of the slave apparatuses within the same fuel cell system 12 when operating in master mode, programs executed by the controller 24, and the like.

The controller 24 includes one or more dedicated microprocessors or a universal processor that reads a program for executing particular functions. The controller 24 controls the components of the respective apparatus and, in the case of the master apparatus 16a, the controller 24 controls the other fuel cell apparatuses (slave apparatuses 16b, 16c).

The controller 24 controls the respective apparatus in any of a plurality of operating modes including a master mode for controlling the operation state of the respective apparatus and of the other fuel cell apparatuses, and a slave mode in which the operation state is to be controlled by another fuel cell apparatus. For example, when the respective apparatus is the master apparatus 16a, the controller 24 can issue an instruction to change state to either or both of the slave apparatuses 16b and 16c. When the respective apparatus is the slave apparatus 16b or 16c, the controller 24 receives an instruction to change state from the master apparatus 16a and changes the state of the respective apparatus.

The master and slave operating modes can be switched with a predetermined procedure, and each of the first to third fuel cell apparatuses 16a to 16c can become either a master apparatus or a slave apparatus. However, with the exception of when the fuel cell apparatus 16 operating in master mode switches, the fuel cell apparatus that executes master mode processing can always be limited to one fuel cell apparatus within the fuel cell system 12. Here, a state change refers to changing between the aforementioned stopped state, standby state, and power generation state. When executing processing in the master mode, the controller 24 can always control the respective fuel cell apparatus (the master apparatus 16a) to be in the power generation state.

The controller 24 of the master apparatus 16a that executes processing in the master mode periodically acquires distinguishing information, such as the cumulative operating time, from the other fuel cell apparatuses (slave apparatuses 16b, 16c) operating in the slave mode. This information can be acquired by the controller 24 of the master apparatus 16a by sequentially and periodically requesting transmission of information from the slave apparatuses 16b, 16c through the communication unit 21, and the slave apparatuses 16b, 16c responding to the request. Alternatively, the slave apparatuses 16b, 16c may each be configured to transmit information periodically to the master apparatus 16*a* automatically. The controller 24 of the master apparatus 16*a* periodically acquires the power consumption of the load 15 from the energy management apparatus 13.

Furthermore, when performing control in the master mode, the controller 24 of the master apparatus 16*a* transmits the cumulative operating time acquired from the timing unit 22 of the master apparatus 16*a* and the cumulative operating time of the slave apparatuses 16*b* and 16*c* acquired from these apparatuses to the external management apparatus 18 with the communication unit 21. The controller 24 transmits these cumulative operating times to the external management apparatus 18 along with information on the power consumption of the load 15.

The controller 24 also receives control information from the external management apparatus 18, such as a "slave state change instruction", a "master change instruction", and a "slave stop instruction".

Upon receiving a "slave state change instruction", the controller 24 of the master apparatus 16*a* issues a state change instruction designated by the external management apparatus 18 to the slave apparatus 16*b* or 16*c* designated by the external management apparatus 18.

Upon receiving a "master change instruction", the controller 24 of the master apparatus 16*a* transmits a master switching instruction to the slave apparatus 16*b* or 16*c* designated by the external management apparatus 18 to be the master apparatus after the change. The controller 24 of the master apparatus 16*a* then waits for completion of master switch processing by the designated slave apparatus 16*b* or 16*c*. The controller 24 of the master apparatus 16*a* changes its own mode to slave mode upon receiving a "notification of completion of operating mode change", from the designated slave apparatus 16*b* or 16*c*, indicating completion of the change to master mode. When receiving a master apparatus change instruction, the controller 24 may also receive a stop instruction for the respective apparatus. In this case, after changing to slave mode, the controller 24 transitions to the stopped state.

Upon receiving a "slave stop instruction", the controller 24 of the master apparatus 16*a* instructs the slave apparatus 16*b* or 16*c* designated by the external management apparatus 18 to stop.

On the other hand, when executing processing in slave mode, the controller 24 periodically acquires the cumulative operating time (distinguishing information) from the timing unit 22 of the respective apparatus, for example the slave apparatus 16*b* or 16*c*. The controller 24 transmits the cumulative operating time to the master apparatus 16*a* with the communication unit 21. The controller 24 may transmit the cumulative operating time by responding to a request from the master apparatus 16*a*. Alternatively, an information transmission event from the controller 24 that executes processing in slave mode to the master apparatus 16*a* may be generated automatically.

Furthermore, other than when transmitting information periodically to the master apparatus 16*a*, the controller 24 executing processing in slave mode stands by for control information indicating an instruction from the master apparatus 16*a*. Upon receiving a state change instruction from the master apparatus 16*a*, the controller 24 changes the state to the designated state. Also, upon receiving a master switching instruction from the master apparatus 16*a*, the controller 24 changes the operating mode from slave mode to master mode. Once the change of the operating mode is complete, the controller 24 transmits the notification of completion of operating mode change to the master apparatus 16*a* through the communication unit 21.

Figure 3:
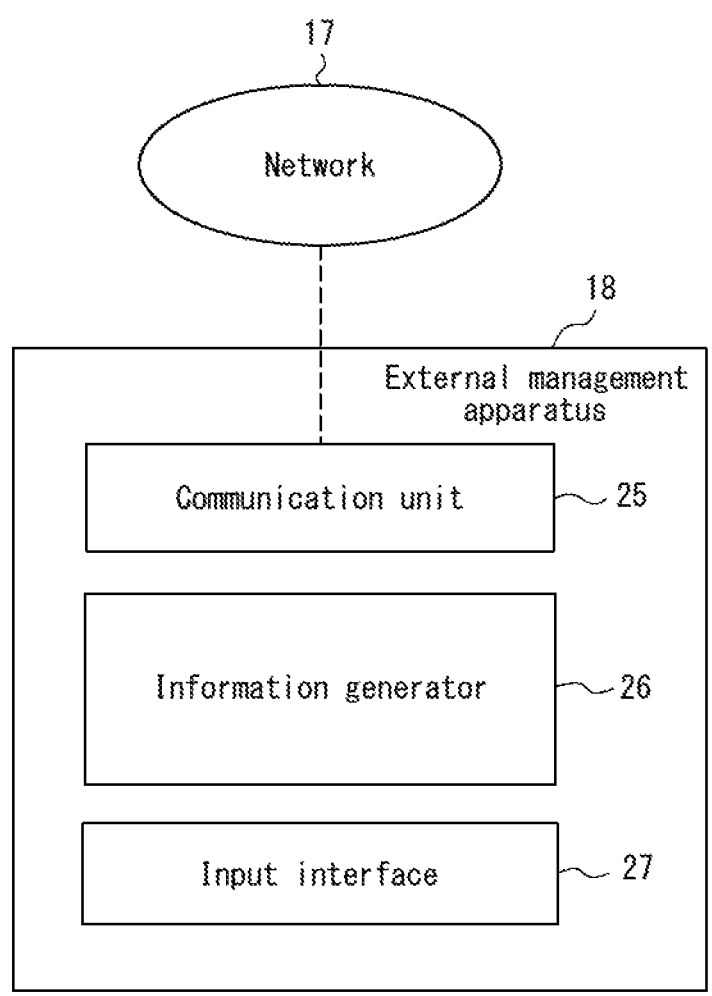
FIG. 3 is a functional block diagram illustrating the schematic configuration of the external management apparatus in FIG. 1.

Next, the configuration of the external management apparatus 18 is described with reference to FIG. 3. The external management apparatus 18 includes a communication unit 25, a control information generator 26 (information generator 26), and an input interface 27. The communication unit 25 functions as an acquisition interface and an output interface.

The communication unit 25 exchanges information with other devices. For example, the communication unit 25 receives information such as the cumulative operating time of the first to third fuel cell apparatuses 16*a* to 16*c*, the power consumption of the load 15, and the like from the master apparatus 16*a* of the fuel cell system 12. The communication unit 25 can also transmit control information, such as the "state change instruction", "master change instruction", and "slave stop instruction" for the slave apparatuses 16*b*, 16*c* to the master apparatus 16*a*. Furthermore, the communication unit 25 may be configured to acquire information such as the power consumption directly from the energy management apparatus 13 as necessary, without going through the master apparatus 16*a*.

The information generator 26 controls switching of the state of the slave apparatuses 16*b* and 16*c* on the basis of information, received from the master apparatus 16*a*, on the power consumption of the load 15 and the cumulative operating time of the first to third fuel cell apparatuses 16*a* to 16*c*.

For example, suppose that the rated output of each of the first to third fuel cell apparatuses 16*a* to 16*c* is 1 kW. When all of the first to third fuel cell apparatuses 16*a* to 16*c* are in the power generation state and the power consumption has changed to less than 2 kW, the information generator 26 selects the fuel cell apparatus between the slave apparatuses 16*b*, 16*c* that has the longer cumulative operating time (for example, the third fuel cell apparatus 16*c*). The information generator 26 then generates control information instructing the selected third fuel cell apparatus 16*c* to change to the standby state and transmits the control information as a slave state change instruction to the master apparatus 16*a* with the communication unit 25. Here, the power consumption of the third fuel cell apparatus 16*c* in the standby state should be reflected in the power consumption of the load 15, since a portion of the one or more auxiliary devices 20 also operate and consume power during the standby state of the fuel cell apparatus 16*c*.

Suppose that the master apparatus 16*a* and the slave apparatus 16*b* are in the power generation state, the slave apparatus 16*c* is in the standby state, and the power consumption has risen to 2 kW or greater. In this case, the information generator 26 generates control information instructing the third fuel cell apparatus 16*c* in the standby state to change to the power generation state and transmits the control information as a slave state change instruction to the master apparatus 16*a* with the communication unit 25.

When the cumulative operating time of the master apparatus 16*a* exceeds a predetermined threshold (predetermined time), the information generator 26 selects the fuel cell between the slave apparatuses 16*b*, 16*c* that has the shorter cumulative operating time (for example, the fuel cell apparatus 16*b*) as the new master apparatus. The information generator 26 transmits a master change instruction including an identifier of the new master apparatus 16*b* to the master apparatus 16*a*. Here, a plurality of thresholds is set for the cumulative operating time of the fuel cell apparatuses 16, and each time the cumulative operating time exceeds these thresholds, the master apparatus switches to the fuel cell apparatus with the shortest cumulative operating time. In this manner, the cumulative operating time of the first to third fuel cell apparatuses 16a to 16c can be prevented from becoming extremely uneven.

Even when the cumulative operating time of the master apparatus 16a does not exceed a predetermined threshold, the information generator 26 selects a new master apparatus 16b when a master stop instruction is received, in the same manner as the case in which the threshold is exceeded. The information generator 26 transmits a master change instruction including an identifier of the new master apparatus 16b to the master apparatus 16a. The master stop instruction is, for example, input to the external management apparatus 18 through the input interface 27, which is a keyboard, a touch panel, or the like. The master stop instruction can also be transmitted from the master apparatus 16a to the external management apparatus 18 in various circumstances, such as when the master apparatus 16a determined to stop as a result of self-diagnosis, or when a stop button of the master apparatus 16a is pressed.

Furthermore, when a slave stop instruction for a slave apparatus (for example, the fuel cell apparatus 16b) is received, the information generator 26 judges whether another slave apparatus (for example, the fuel cell apparatus 16c) should be changed from the standby state to the power generation state to satisfy power consumption. The information generator 26 transmits, to the master apparatus 16a, control information including the slave stop instruction for the fuel cell apparatus 16b for which the slave stop instruction was received. As necessary, the information generator 26 also transmits a slave state change instruction to the master apparatus 16a along with the aforementioned control information. The slave state change instruction indicates a change to the power generation state for the other fuel cell 16c operating in slave mode. A slave stop instruction may also, for example, be input to the information generator 26 through the input interface 27 of the external management apparatus 18 or by being transmitted to the external management apparatus 18 from the master apparatus 16a.

Figure 4:
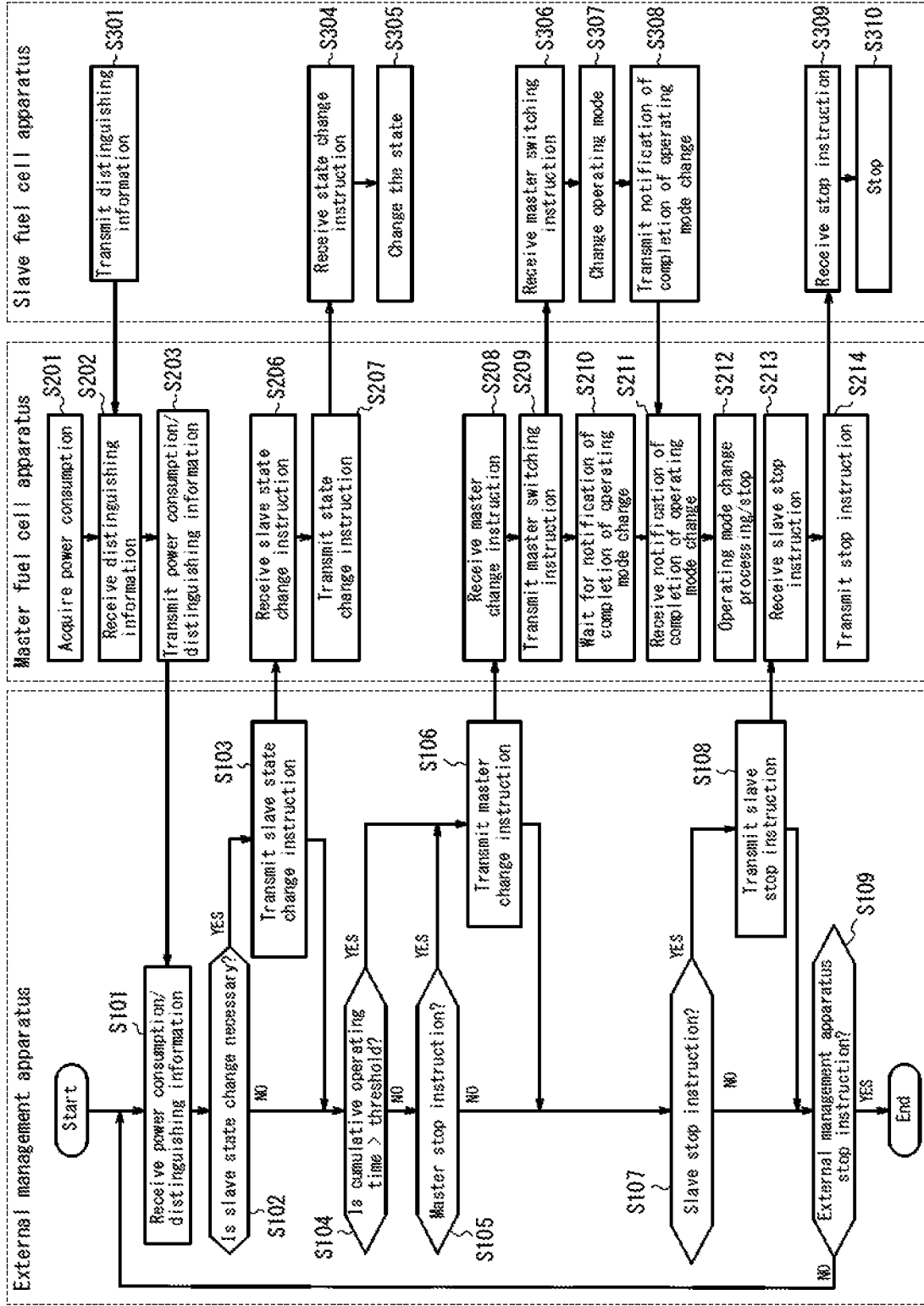
FIG. 4 is a flowchart illustrating control executed by the controller of the external management apparatus along with processing on the fuel cell apparatus operating in master mode and the fuel cell apparatus operating in slave mode.

Next, an example of operation control of the fuel cell system 12 as executed by the external management apparatus 18 is described with reference to the flowcharts in FIG. 4 to FIG. 6. The flowcharts in FIG. 4 to FIG. 6 are one example, and the order and content of processing can be changed. In the flowchart in FIG. 4, the processing of the master apparatus 16a and the processing of the slave apparatuses 16b and 16c are listed separately, focusing on processing related to the external management apparatus 18. In FIG. 5 and FIG. 6, processing steps that are the same as processing steps in the flowchart of FIG. 4 are labeled with the same numbers and have the same description.

[Information Collection]

The information generator 26 receives the power consumption of the load 15 and the cumulative operating time (distinguishing information) of the first to third fuel cell apparatuses 16a to 16c over a predetermined cycle, for example once a minute (step S101). The master apparatus 16a acquires this power consumption from the energy management apparatus 13 before step S101 (step S201).

As for the cumulative operating time, the slave apparatuses 16b, 16c first acquire the cumulative operating times stored in their respective timing units 22 and transmit the cumulative operating times to the master apparatus 16a before step S101 (step S301). The master apparatus 16a acquires these cumulative operating times along with the cumulative operating time of the master apparatus 16a from the timing unit 22 (step S202). The master apparatus 16a transmits the power consumption acquired in step S201 and the cumulative operating time of each of the fuel cell apparatuses 16a to 16c acquired in step S202 to the external management apparatus 18 (step S203).

At this time, the master apparatus 16a may acquire the information on the current operation state of each of the fuel cell apparatuses 16a to 16c, i.e. information on whether the operation state is the power generation state, the standby state, or the stopped state; the output in the case of the power generation state; the power consumption in the case of the standby state; and the like. The master apparatus 16a may be configured also to notify the external management apparatus 18 of these acquired pieces of information.

In the flowchart of processing by the master apparatus 16a in FIG. 5, the processing from step S201 to step S203 is executed repeatedly in synchronization with the predetermined cycle for the information generator 26 of the external management apparatus 18 to collect the power consumption and the cumulative operating time in step S101. After completion of step S203, the master apparatus 16a stands by for an instruction from the external management apparatus 18 until the next execution of the processing of step S201 (step S204). Upon receiving an instruction from the external management apparatus 18, the master apparatus 16a executes processing in accordance with the instruction (step S205).

In the flowchart of processing by the slave apparatuses 16b, 16c in FIG. 6 as well, the processing of step S301 is executed repeatedly over a predetermined cycle. After completion of step S301, the slave apparatuses 16b, 16c stand by for an instruction from the master apparatus 16a until the next execution of the processing of step S301 (step S302). Upon receiving an instruction from the master apparatus 16a, the slave apparatuses 16b, 16c execute processing in accordance with the instruction (step S303).

The master apparatus 16a can transmit the power consumption and the cumulative operating time separately to the external management apparatus 18 instead of simultaneously. In the case of the master apparatus 16a transmitting these pieces of information separately, the external management apparatus 18 can execute the processing of the below-described steps S102 to S103 upon receiving the power consumption. The external management apparatus 18 can be configured to execute the processing of the below-described steps S104 to S106 upon receiving the cumulative operating time.

[Slave State Change]

Returning to FIG. 4, the information generator 26 of the external management apparatus 18 judges whether a state change in the operation state of the slave apparatuses 16b, 16c is necessary on the basis of the power consumption of the load 15 (step S102). The information generator 26 generates control information instructing to change the state when judging that a state change is necessary and transmits the control information to the master apparatus 16a with the communication unit 25 (step S103). When the information generator 26 judges that a state change is not necessary in step S102, processing proceeds to step S104.

When judging that the power consumption of the load 15 is smaller than the amount of power generated by the fuel cell apparatuses 16a to 16c in operation and that the number of fuel cell apparatuses 16a to 16c in the power generation state is large, the information generator 26 issues the state change instruction. The state change instruction includes an instruction to change one of the slave apparatuses 16b, 16c from the power generation state to the standby state. In the reverse case, the information generator 26 issues an instruction to change from the standby state to the power generation state. The information generator 26 selects the slave apparatus 16b or 16c with the longer cumulative operating time to change from the power generation state to the standby state. When the slave apparatus 16b or 16c to be changed from the standby state to the power generation state can be selected from a plurality of fuel cells, the information generator 26 selects the one with the shortest cumulative operating time. With this approach, the cumulative operating time can be leveled between the first to third fuel cell apparatuses 16a to 16c.

As illustrated in FIG. 4 and FIG. 5, the state change instruction for the slave apparatus 16b or 16c transmitted by the external management apparatus 18 is received by the master apparatus 16a (step S206). The master apparatus 16a transmits the state change instruction in accordance with an instruction from the external management apparatus 18 to the slave apparatus 16b or 16c that is included in the received control information and is targeted for a state change (step S206).

As illustrated in FIG. 4 and FIG. 6, upon receiving a state change instruction from the master apparatus 16a (step S304), the slave apparatus 16b or 16c executes a state change from the power generation state to the standby state, or from the standby state to the power generation state, in accordance with the instruction (step S305). Furthermore, while not indicated in the flowcharts in FIG. 4 to FIG. 6, the slave apparatus 16b or 16c can notify the master apparatus 16a of completion of the change once the state change is complete. After receiving notification of completion of the change, the master apparatus 16a may further notify the external management apparatus 18 of completion of the slave state change instruction. As a result, the external management apparatus 18 can always update and store the latest operation state of each fuel cell apparatus 16a to 16c.

[Master Change]

Next, the information generator 26 of the external management apparatus 18 compares the cumulative operating time of the master apparatus 16a acquired in step S101 with a predetermined operating time threshold. When the cumulative operating time exceeds the threshold, processing proceeds to transmission of a master change instruction (step S106). When the cumulative operating time is equal to or less than the threshold, processing returns to step S105. In step S105, the information generator 26 judges whether a master stop instruction has been received. If a master stop instruction has been received, processing proceeds to transmission of the master change instruction (step S106). If the master stop instruction has not been received, processing proceeds to step S107.

In step S106, the information generator 26 of the external management apparatus 18 generates control information instructing to change the master and transmits the control information to the master apparatus 16a. The control information of the master change instruction includes the new master apparatus after the change and the operation state, after the change, of the current master apparatus. The operation state of the fuel cell apparatus 16a after the change is the stopped state when step S106 is executed after step S105 for instructing the master apparatus 16a to stop. As the new master apparatus after the change, the information generator 26 selects whichever of the fuel cell apparatus 16b and 16c has the shortest cumulative operating time by referring to the cumulative operating time of each fuel cell apparatus 16a to 16c received in step S101.

The master apparatus 16a receives the control information of the master change instruction transmitted by the external management apparatus 18 (step S208). The master apparatus 16a transmits control information of a master switching instruction to the slave apparatus 16b or 16c that is included in the received control information and becomes the new master apparatus after the change (step S209). Subsequently, the master apparatus 16a enters the standby state to wait for a notification of completion of operating mode change from the slave apparatus 16b or 16c that received the master switching instruction (step S210).

Once the slave apparatus 16b or 16c that becomes the new master apparatus after the change ("master apparatus after the change") receives the control information of the master switching instruction (step S306), the slave apparatus 16b or 16c changes itself to the master apparatus as follows. First, the slave apparatus 16b or 16c that becomes the master apparatus after the change confirms whether the current operation state is the power generation state and changes to the power generation state if the operation state is the stopped state or the standby state. Upon confirming that the current operation state is the power generation state, the slave apparatus 16b or 16c that becomes the master apparatus after the change switches the operating mode of the controller 24 to the master mode (step S307). Subsequently, the master apparatus after the change transmits a notification of completion of operating mode change indicating that the change in operating mode is complete to the master apparatus 16a that issued the master switching instruction ("master apparatus before the change") and to the other slave apparatus (step S308). The master apparatus 16a before the change may instead issue the notification to the other slave apparatus after receiving the notification of completion of operating mode change.

Upon receiving the notification of completion of operating mode change (step S211), the master apparatus before the change switches the operating mode of its own controller 24 to the slave mode and then changes the operation state in accordance with information, on the operation state after the change, included in the master change instruction (step S212). While not indicated in the flowcharts in FIG. 4 and FIG. 5, the master apparatus before the change or the master apparatus after the change may notify the external management apparatus 18 that the change of master apparatus is complete.

When the master apparatus was changed in step S212 and step S307, the first fuel cell apparatus 16a is no longer the master. For the sake of simplicity, the first fuel cell apparatus 16a is still described below as being the master apparatus 18a, and the second and third fuel cell apparatuses 16b, 16c as being the slave apparatuses 16b, 16c.

[Slave Stop]

Next, in the case of a slave stop instruction for the external management apparatus 18 (step S107), the information generator 26 generates control information of the slave stop instruction and transmits the control information to the master apparatus 16a (step S108). The control information of the slave stop instruction includes identifying information of the slave apparatus 16b or 16c that is targeted for stopping.

Upon receiving the slave stop instruction (step S213), the master apparatus 16a transmits control information of the stop instruction to the slave apparatus 16b or 16c that is targeted for stopping (step S214).

Upon receiving the stop instruction (step S309), the slave apparatus 16b or 16c changes the operation state from the power generation state or the standby state to the stopped state (step S310). While not indicated in FIG. 4 to FIG. 6, the slave apparatus 16b or 16c can notify the master apparatus 16a of completion once the stop is complete. After receiving this notification, the master apparatus 16a can notify the external management apparatus 18 of completion of the slave stop instruction.

In the case of no master stop instruction in step S107, or when the processing of step S108 is complete, the external management apparatus 18 may repeat the above-described processing steps S101 to S108 as long as the external management apparatus 18 has not been instructed to stop (step S109).

When the same power generation apparatus always operates as the master apparatus among a plurality of power generation apparatuses and the other power generation apparatuses operate as slave apparatuses, then the entire fuel cell system may become unable to operate if a blackout occurs while the master apparatus is in the standby state. Conversely, with the above configuration, the fuel cell apparatus system of the disclosure allows the controllers mounted in a plurality of fuel cell apparatuses installed in parallel to operate in either of the master and slave operating modes. As a result, the master apparatus can be switched between a plurality of fuel cell apparatuses, and since the master apparatus is always in the power generation state, the master apparatus does not stop operating during a blackout. Furthermore, if the master apparatus fails, the master apparatus can be switched to another fuel cell apparatus. By switching the master apparatus with a slave apparatus, the external management apparatus can prevent only one fuel cell apparatus from continually generating power, thereby controlling a reduction in the lifespan of the fuel cell system as a whole. Control by the external management apparatus also allows the operation state of the fuel cell apparatuses to be controlled in accordance with the power consumption of the load, thereby allowing efficient generation of the necessary power.

Changing the master apparatus when the master apparatus, including the controller thereof, is stopped for maintenance makes it unnecessary to stop other fuel cell apparatuses, thereby improving the utilization rate of the plurality of fuel cell apparatuses as a whole. Furthermore, the fuel cell apparatus used as the master apparatus is always in the power generation state. Therefore, power generation by the fuel cell system is maintained even in the case of a blackout in the power grid.

Since each fuel cell apparatus is controlled by the external management apparatus through the master apparatus, the same external management apparatus can be used to control the fuel cell system stably even when the master apparatus changes or the operation state of each fuel cell apparatus changes. Furthermore, the external management apparatus can remotely monitor the fuel cell system since the external management apparatus can also be installed in a remote location over a network. Since the external management apparatus controls each fuel cell apparatus through the master apparatus, the communication volume can also be reduced as compared to when each fuel cell apparatus communicates individually with the external management apparatus.

Furthermore, the control method for a fuel cell apparatus of the present embodiment selects the fuel cell apparatus with the shortest cumulative operating time as the master apparatus. As a result, the fuel cell apparatuses are all selected on average to be the master apparatus, thereby further improving the utilization rate and controlling a reduction in lifespan.

Furthermore, the control method for a fuel cell apparatus of the present embodiment selects a new master apparatus when the cumulative operating time of the fuel cell apparatus selected as the master apparatus exceeds a threshold, thereby optimizing the timing for switching the master apparatus. Accordingly, a drop in the utilization rate due to the master apparatus suddenly stopping or the like can be controlled, as can a reduction in lifespan of the master apparatus.

Second Embodiment

The following describes a second embodiment.

In the first embodiment, the distinguishing information that the external management apparatus 18 uses in step S106 to determine the fuel cell apparatus that becomes the new master apparatus after the change is the cumulative operating time of the first to third fuel cell apparatuses 16a to 16c. In the present embodiment, the rated output of each fuel cell apparatus 16a to 16c is used as the distinguishing information. The present embodiment and the first embodiment share in common the configuration of the apparatuses and system illustrated in FIG. 1 to FIG. 3 and the range of processing illustrated in the processing flowcharts of FIG. 4 to FIG. 6. Only the differences from the first embodiment are described below with reference to these figures. The same reference signs are used for constituent elements that are the same as or correspond to constituent elements of the first embodiment.

In the first embodiment, the first to third fuel cell apparatuses 16a to 16c have an equivalent rated output of 1 kW. By contrast, the rated output differs for the first to third fuel cell apparatuses 16a to 16c in the present embodiment, as listed in Table 1.

TABLE 1

| Apparatus | Rated Output of Fuel Cell Apparatuses | | |
|---|---|---|---|
| | First fuel cell apparatus | Second fuel cell apparatus | Third fuel cell apparatus |
| Rated output | 2 kW | 700 W | 300 W |

These rated outputs are stored in the memory 23 of the first to third fuel cell apparatuses 16a to 16c in advance. The second and third fuel cell apparatuses (slave apparatuses) 16b and 16c transmit the distinguishing information to the first fuel cell apparatus (master apparatus) 16a in the step of transmitting distinguishing information in step S301. The distinguishing information includes the rated output acquired from the memory 23 as well as the cumulative operating time acquired from the timing unit 22.

The master apparatus 16a receives this distinguishing information in step S202 and transmits this distinguishing information as well as the power consumption of the load 15 to the external management apparatus 18 in step S203. As a result, the external management apparatus 18 acquires distinguishing information that includes the rated output in step S101.

The external management apparatus 18 uses the rated output as follows. First, in steps S102 and S103, the external management apparatus 18 judges whether a state change is necessary for the second and third fuel cell apparatuses (slave apparatuses) 16b, 16c on the basis of the power consumption of the load 15 and the rated output. For example, suppose that the first fuel cell apparatus (master apparatus) 16a and the third fuel cell apparatus 16c are in the power generation state, whereas the second fuel cell apparatus 16b is in the standby state. When the power consumption of the load 15 acquired in step S101 exceeds or is predicted to exceed 2300 W, the external management apparatus 18 changes the operation state of the second fuel cell apparatus 16b in step S103 to the power generation state. The external management apparatus 18 also transmits an instruction to change the operation state of the third fuel cell apparatus 16c to the standby state. In this manner, the output of the fuel cell system 12 can be set to an appropriate value in accordance with the power consumption of the load 15.

When the master apparatus changes, the information on the rated output can also be used during the processing to select the master apparatus after the change. In the step of transmitting the master change instruction in step S106, the external management apparatus 18 can select whichever of the second and third fuel cell apparatuses (slave apparatuses) 16b, 16c has the greatest rated output to be the master apparatus after the change. In this manner, the usable fuel cell apparatus with the greatest rated output can always be used as the master apparatus.

Alternatively, the external management apparatus 18 can select the fuel cell apparatus with the rated output that is greater than and closest to the power consumption acquired in step S101 to be the master apparatus after the change. For example, if the power consumption is 600 W, the external management apparatus 18 selects the second fuel cell apparatus 16b as the master apparatus.

The external management apparatus 18 can also accumulate a variation pattern of the power consumption of the load 15 and use the pattern to select the master apparatus after the change. The variation pattern is, for example, a variation pattern in the power consumption over one day, one week, one month, or the like. In the step of transmitting the change instruction in step S106, the external management apparatus 18 selects the master apparatus after the change so that the usage efficiency of the fuel cell system is optimized for the variation pattern. For example, if there is a time slot during the day in which the power consumption is minimized, a fuel cell apparatus with a rated output that is greater than and close to the power consumption in that time slot can be selected as the master apparatus after the change.

In this manner, the present embodiment can change the operation state and/or change the operating mode so as to optimize output of the fuel cell system 12 in accordance with differences in the rated output of the fuel cell apparatuses.

The disclosure is not limited to the above embodiments, and a variety of modifications and changes are possible. For example, an apparatus that constitutes a load has been described as transmitting the respective power consumption to the energy management apparatus, and the energy management apparatus has been described as transmitting this power consumption to the master apparatus, but this configuration is not limiting. The master apparatus may, for example, acquire the power consumption directly from the load. The information on the power consumption acquired by the energy management apparatus has been described as being transmitted to the external management apparatus through the master apparatus. In one of the embodiments, the external management apparatus may acquire the information on the power consumption directly from the energy management apparatus.

The state change of the slave apparatus in step S102 performed by the information generator of the external management apparatus can also be performed between the stopped state and either the power generation state or the standby state, instead of only between the power generation state and the standby state. For example, the external management apparatus may include a timing unit and may change the state of a slave apparatus in the standby state to the stopped state during a time slot from late at night to early morning, when power demand is low.

The master mode and the slave mode have been provided as examples of operating modes of the fuel cell apparatus, but the operating modes are not limited to these modes. For example, when the fuel cell apparatuses first start up, the fuel cell apparatuses can transmit distinguishing information by communicating with the external management apparatus so that the external management apparatus can determine which fuel cell apparatus will be the master. In this manner, the fuel cell apparatuses can include an operating mode exclusively for startup. The fuel cell apparatuses may also operate independently in cases such as when communication between the master apparatus and the slave apparatuses is cut off for some reason. Accordingly, the fuel cell apparatus can include an independent operation mode for when such errors occur.

The time at which the external management apparatus issues the master change instruction is not limited to when the cumulative operating time of the fuel cell apparatus operating in master mode exceeds a predetermined time or to when the external management apparatus receives an instruction for the fuel cell apparatus operating in master mode to change to the stopped state. For example, when there is a difference in the rated output of each fuel cell apparatus, the external management apparatus can continually monitor the power consumption of the load over a certain period of time. Subsequently, the external management apparatus can issue a change instruction to change the fuel cell apparatus that operates in master mode and always generates power to the fuel cell apparatus that has the optimal rated output for the power consumption.

An apparatus located outside of the facility and connected over a network has been described as being used as the external management apparatus. In one of the embodiments, the external management apparatus can be located within the same facility instead of being outside of the facility.

Furthermore, a higher-order system with respect to the external management apparatus may be provided. The external management system transmits information such as the cumulative operating time and the power consumption obtained from the master apparatus to the higher-order system. The higher-order system tallies and monitors the operating time and the like of each fuel cell apparatus. In this manner, the higher-order system generates instructions such as an instruction to change the operation state, to change the master apparatus and the slave apparatus, and to stop the fuel cell apparatus. The external management apparatus accepts the task of executing of these instructions from the higher-order system through the communication unit. In this manner, a higher-order system can centrally manage a plurality of fuel cell systems.

REFERENCE SIGNS LIST

10 Power supply system
11 Distribution board
12 Fuel cell system
13 Energy management apparatus
14 Power grid
15 Load
16 Fuel cell apparatus
16a First fuel cell apparatus (master apparatus)

16b Second fuel cell apparatus (slave apparatus)
16c Third fuel cell apparatus (slave apparatus)
17 Network
18 External management apparatus
19 Power generator
20 Auxiliary device
21 Communication unit (receiver, transmitter)
22 Timing unit
23 Memory
24 Controller
25 Communication unit (acquisition interface, output interface)
26 Information generator
27 Input interface

The invention claimed is:

1. A fuel cell system comprising:
a plurality of fuel cell apparatuses configured to supply power to a load; and
an external management apparatus,
wherein
the plurality of fuel cell apparatuses and the external management apparatus are connected to a network and configured to communicate with each other,
each fuel cell apparatus in the plurality of fuel cell apparatuses comprises a controller configured to control its respective fuel cell apparatus in any of a plurality of operating modes comprising a master mode and a slave mode, wherein a fuel cell apparatus performing control in the master mode controls its own operation state and an operation state of another fuel cell apparatus, and a fuel cell apparatus performing control in the slave mode controls its own operation state according to operation state control received from another fuel cell apparatus,
the external management apparatus comprises an acquisition interface configured to acquire a power consumption of the load, an information generator configured to generate control information, on the basis of the power consumption, for controlling the operation state of the plurality of fuel cell apparatuses, and an output interface configured to output the control information to a fuel cell apparatus operating in the master mode, and
a fuel cell apparatus operating in the master mode controls its own operation state and the operation state of another fuel cell apparatus on the basis of the control information output by the external management apparatus.

2. The fuel cell system of claim 1, wherein a fuel cell apparatus operating in the master mode is configured to acquire the power consumption from an energy management apparatus and transmit the power consumption to the acquisition interface, the energy management apparatus being configured to monitor the power consumption.

3. The fuel cell system of claim 1, wherein the operation states of the plurality of fuel cell apparatuses comprises a power generation state and a standby state, and the information generator is configured to generate control information for switching at least one fuel cell apparatus operating in the slave mode between the power generation state and the standby state on the basis of the power consumption.

4. The fuel cell system of claim 1, wherein
each fuel cell apparatus comprises at least one of a timing unit configured to count a cumulative operating time of the respective fuel cell apparatus and a memory configured to store a rated output of the respective fuel cell apparatus,
the controller is configured to:
acquire at least one of the cumulative operating time and the rated output of the respective fuel cell apparatus as distinguishing information,
transmit the distinguishing information to a fuel cell apparatus operating in the master mode when the controller operates in the slave mode, and
transmit the distinguishing information acquired from the respective fuel cell apparatus and the distinguishing information received from another fuel cell apparatus to the acquisition interface when the controller operates in the master mode, and
the information generator is configured to generate a master change instruction to change which of the plurality of fuel cell apparatuses operates in the master mode by selecting, when a predetermined condition is satisfied, one fuel cell apparatus operating in the slave mode to operate in the master mode after the change on the basis of the distinguishing information of the fuel cell apparatuses received from the fuel cell apparatus operating in the master mode.

5. The fuel cell system of claim 4, wherein the distinguishing information comprises the cumulative operating time, and the information generator generates the master change instruction when the predetermined condition is satisfied by the cumulative operating time of the fuel cell apparatus operating in the master mode exceeding a predetermined threshold or when an instruction to change the fuel cell apparatus operating in the master mode to the stopped state has been received.

6. The fuel cell system of claim 4, wherein the information generator of the external management apparatus selects a fuel cell apparatus with a shortest cumulative operating time to operate in the master mode after the change.

7. The fuel cell system of claim 4, wherein the information generator selects a fuel cell apparatus with a maximum rated output to operate in the master mode after the change.

8. The fuel cell system of claim 4, wherein the information generator selects a fuel cell apparatus with a rated output greater than and closest to the power consumption to operate in the master mode after the change.

* * * * *